Jan. 2, 1934.　　　　A. BARÉNYI　　　1,941,784
PHOTOGRAPHIC CAMERA
Filed July 8, 1932　　　3 Sheets-Sheet 3

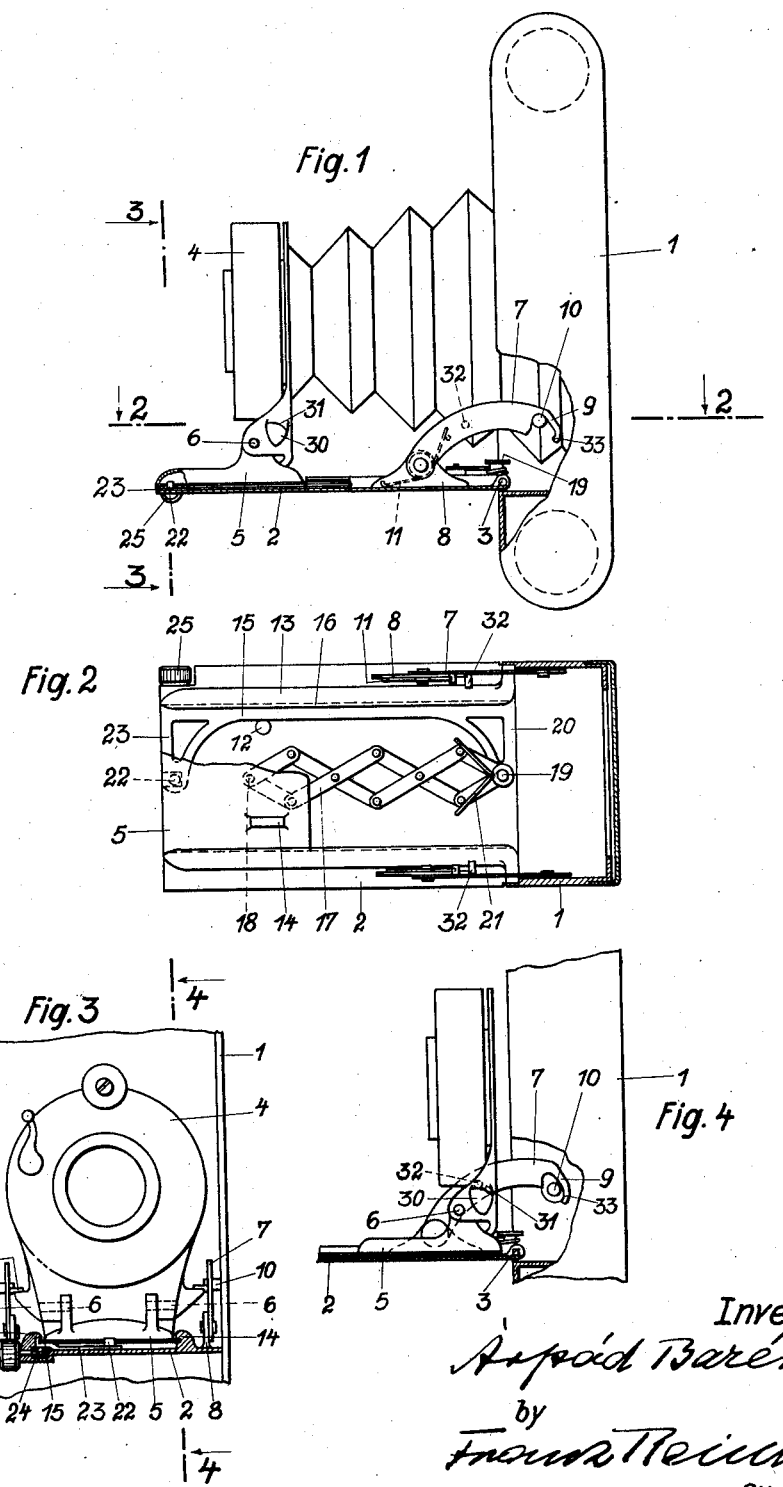

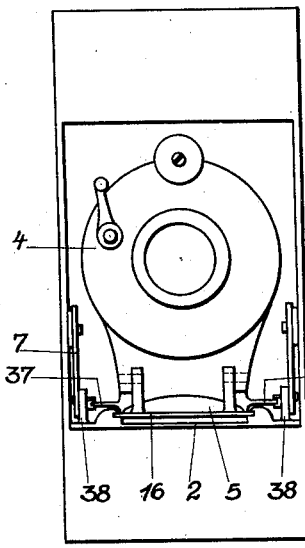
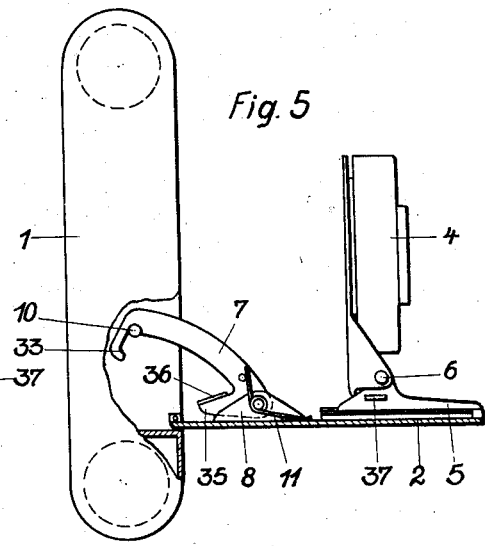
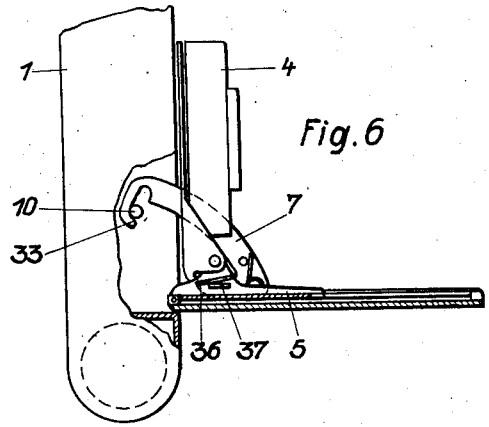

Inventor
Arpád Barényi
by
Frank Reinhold
Attorney.

Patented Jan. 2, 1934

1,941,784

UNITED STATES PATENT OFFICE 1,941,784

PHOTOGRAPHIC CAMERA

Árpád Barényi, Berlin-Lichterfelde, Germany, assignor to Voigtländer & Sohn Aktiengesellschaft, Brunswick, Germany, a joint-stock company of Germany Application July 8, 1932, Serial No. 621,359, and in Germany August 4, 1931

8 Claims. (Cl. 95—40)

My invention relates to improvements in photographic cameras, and more particularly in cameras in which the lens front is slidably supported on a baseboard or bed which is hinged to the body of the camera and held in projected position by means of rockable arms. The object of the improvements is to provide a camera of this type in which the said arms are automatically brought into releasing position, permitting the bed to be collapsed when the lens front is shifted inwardly. With this object in view my invention consists in providing means controlled by the lens front for shifting the said arms to releasing position. In the preferred embodiment of the invention the lens front is formed at its side or sides with a cam or cams adapted to engage the said arm or arms and to rock the same out of locking position.

Another improvement relates to that type of cameras in which the carriage forming a part of the lens front is shiftable on a slide movable on the bed and provided with means for setting the lens front in position. In constructions of this type such as are now in use four guide ways or tracks are provided, two for the carriage forming a part of the lens front and two for the slide on which the said carriage is shiftable. The object of the improvements is to provide a camera of this type in which the guiding means for the lens front require little space, so that the breadth of the bed may be reduced, and which can be manufactured at low cost and has a reduced weight. With this object in view my invention consists in mounting the carriage at one side on a slide or rail which is slidable longitudinally of the bed, while at the opposite side the said carriage is directly guided in a track secured to the bed. Thus only three tracks are needed.

Other objects of the improvements will appear from the following description.

Figure 8:
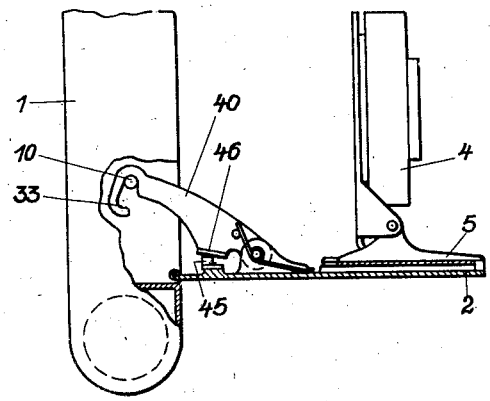
Figure 9:
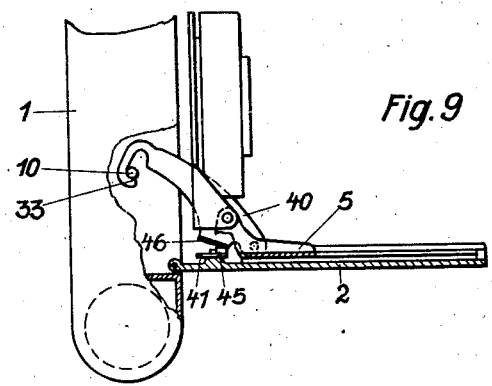
Figure 10:
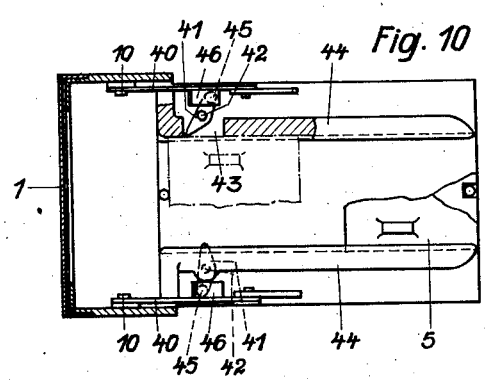

For the purpose of explaining the invention several examples embodying the same have been shown in the accompanying drawings in which the same reference characters have been used in all the views to indicate corresponding parts. In said drawings, Fig. 1 is an elevation partly in section showing the camera, Fig. 2 is a sectional plan view taken on the line 2—2 of Fig. 1, Fig. 3 is a fragmentary sectional elevation taken on the line 3—3 of Fig. 1, Fig. 4 is a fragmentary elevation partly in section showing in releasing position the arms for holding the bed, Fig. 5 is an elevation partly in section showing a modification, the arms being in position for holding the bed projected, Fig. 6 is a fragmentary elevation showing the said arms in releasing position, Fig. 7 is an elevation viewed from the right in Fig. 5, Fig. 8 is a fragmentary elevation partly in section and showing another modification of the camera, the arms being in position for holding the bed projected, Fig. 9 is a similar elevation showing the said arms in releasing position, and Fig. 10 is a top plan view of Figs. 8 and 9 partly in section.

In the examples shown in Figs. 1 to 4 the camera comprises a body or casing 1, a bed 2 hinged thereto at 3, and a lens front. The lens front comprises an upper part 4 in which the lens and other parts are mounted and a carriage 5 on which the upper part 4 is rockingly mounted at 6. Two arms 7 are rockingly mounted on brackets 8 rising from the bed. The said arms are formed with notched ends 9 adapted to engage pins 10 fixed to the side walls of the body 1, and they are acted upon by springs 11 tending to hold the same with their notched ends 9 in abutment upon the pins 10. The upper part 4 of the lens front is acted upon by a spring (not shown) tending to hold the same in erect position but permitting the same to be rocked forwardly when the camera is collapsed.

The bed 2 carries two tracks 13 and 14, and in a longitudinal groove of the track 13 a rail 15 is slidable which is likewise formed with a longitudinal groove 16, the rail 15 being held in position within the guide rail 13 by means of a pin 12 rising from the bed. In the groove of rail 15 and in a corresponding longitudinal groove made in the track 14 the carriage 5 is slidably mounted. The carriage 5 is acted upon by automatic means tending to project the same forwardly, and as shown in Fig. 2, the said automatic means comprise a series of links 17 jointed to form rhombs and connected at one end to a pin 18 secured to the carriage 5 and at the opposite end to a pin 19 secured to an arm 20 of the guide rail 15, and a spring 21 acting on the series of links 17 and adapted to project the same forwardly. To an arm 23 of the rail 15 a pin 22 is secured which is adapted to be engaged by the carriage 5 for limiting the outward movement thereof.

The rail 15 is formed on its nether slide with rack teeth. These teeth are engaged by a pinion 24 mounted in the bed, the shaft of which carries a milled hand wheel 25. By means of the said hand wheel and pinion (with co-operation of spring 21) the rail 15 and the lens front 4, 5 are shifted longitudinally of the baseboard 2 for setting the object glass in position.

The lens front is provided at both sides with lugs 30 having cam faces 31 and each cam face is adapted to engage a pin 32 projecting inwardly from the arm 7 located in the path of the lug 30. Therefore, when the lens front is shifted inwardly for collapsing the camera the said cam faces 31 engage the pins 32 and rock the arms 7 upwardly and with their notched ends 9 out of engagement with the pins 10, as is shown in Fig. 4. Thus by a single operation the lens front is shifted inwardly, and the arms 7 are brought out of locking engagement with the pins 10, whereupon the baseboard 2 may be rocked upwardly. The notched ends of the arms 7 are formed with hook-shaped tips 33 which engage at the rear of the pins 10 when the arms 7 are rocked upwardly and prevent the said arms from being thrown entirely out of engagement with the pins 10. Therefore the baseboard can not be rocked downwardly, though the notches in the arms no longer engage the pins 10.

In Figs. 5 to 7 I have shown a modification of the mechanism for lifting the arms 7. The arms 7 are formed with heels 35 made integral with inclined flanges 36 which are adapted to be engaged by lugs 37, which as shown are secured to the carriage 5 forming a part of the lens front. In the construction shown in the said figures the carriage 5 is guided in two tracks 38 rising from the bed 2. Otherwise the construction is similar to the one described with reference to Figs. 1 to 3 and the same letters of reference have been used to indicate corresponding parts.

In the modification shown in Figs. 8 to 10 the lens front 4, 5 acts on the arms 40 through the intermediary of levers 41 rockingly mounted on pins 42 rising from the bed 2. The inner ends of said levers extend through cut-out portions 43 made in the tracks 44 and into the path of the carriage 5. At their outer ends the levers 41 carry pins 45 which are adapted to engage the nether faces of inclined flanges 46 of the arms 40. In Fig. 10 the operation of the said arms 41 is illustrated. At one side the carriage 5 is shown in full lines and in projected position, and the lever 41 projects into the path thereof, and at the opposite side the carriage is shown in dotted lines and in the position to which it has been shifted towards the body 1, the lever 41 having been rocked for rocking the arm 40 upwardly and into releasing position. The levers 41 are acted upon by springs (not shown) tending to hold the same in the position in which they project into the path of the slide 5.

I claim:

1. A photographic camera, comprising a body, a bed hinged to said body, a releasable member for holding said bed in projected position, said member bearing an outstanding abutment having a surface extending in a plane oblique to the direction in which the lens front is shifted, and a lens front shiftable upon said bed, the parts so arranged that manual pressure exerted on the lens front and driving it inward to collapsed position, brought to bear upon such inclined surface, throws the said member out of position for holding the bed in projected position.

2. A photographic camera, comprising a body, a bed hinged to said body, a releasable member for holding said bed in projected position, a lens front shiftable on said bed, and a cam on said lens front adapted to engage said member for throwing the same out of position for holding said bed in projected position.

3. A photographic camera, comprising a body, a bed hinged to said body, a rockingly mounted arm adapted to hold said bed in projected position, a pin projecting from said arm, a lens front shiftable on said bed, and a cam on said lens front adapted to engage said pin for throwing said arm out of position for holding the bed in projected position.

4. A photographic camera, comprising a body, a bed hinged to said body, a rockingly mounted arm adapted to hold said bed in projected position and formed with a heel carrying an inclined flange, a lens front shiftable on said bed, and a lug on said lens front adapted to engage said inclined flange for throwing said arm out of position for holding the bed in projected position.

5. A photographic camera, comprising a body, a bed hinged to said body, a rockingly mounted arm adapted to hold said bed in projected position and formed with a heel carrying an inclined flange, a lever rockingly mounted on said bed in position for engaging said flange and adapted to rock said arm out of position for holding the bed in projected position, a lens front shiftable on said bed and adapted to engage said lever for throwing said cam out of position for holding the bed in projected position.

6. A photographic camera, comprising a body, a bed hinged to said body, a bed-locking arm rockingly mounted on said bed and movable upwardly from locking to release position and formed with a notched end, a pin secured to said body adapted to be engaged by said notched end when said bed is in projected position, and a hook-shaped tip on the notched end of said arm adapted to engage at the rear of said pin when said arm is rocked upwardly to prevent the bed from being rocked beyond the normal projected position, a lens front shiftable longitudinally on said bed, and means associated with said lens front and operative in response to inward shifting of the same for throwing said arm upwardly.

7. A photographic camera comprising a body, a bed hinged to said body, a lens front shiftable on said bed, and a releasable member for holding said bed in projected position, said releasable member bearing an outstanding abutment arranged in the path of movement of said lens front, the parts so arranged that manual pressure exerted on the lens front and driving it inward to collapsed position, brought to bear upon the abutment, throws the said releasable member out of position for holding said bed in projected position.

8. In a photographic camera, a body, a bed hinged to said body, a lens front shiftable on said bed, a releasable member for holding said bed in projected position, and means mounted wholly on said bed and operative when the shifting lens front approaches the end of its inward movement to throw said releasable member out of position for holding said bed in projected position.

ÀRPÁD BARÉNYI.